(12) United States Patent
Yapel et al.

(10) Patent No.: US 6,790,404 B2
(45) Date of Patent: Sep. 14, 2004

(54) PROCESS OF MAKING MICROPOROUS FILM

(75) Inventors: Robert A. Yapel, Oakdale, MN (US); Shannon K. Hughes, Minneapolis, MN (US); William Blake Kolb, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 323 days.

(21) Appl. No.: 09/961,025

(22) Filed: Sep. 21, 2001

(65) Prior Publication Data

US 2002/0135087 A1 Sep. 26, 2002

Related U.S. Application Data

(60) Provisional application No. 60/235,222, filed on Sep. 24, 2000.

(51) Int. Cl.[7] .................. B29C 41/26; B29C 41/46; B29C 41/52; B29C 47/88; B29C 47/92
(52) U.S. Cl. .............. 264/466; 264/40.1; 264/40.6; 264/41; 264/176.1; 264/216
(58) Field of Search .................. 264/40.1, 40.6, 264/41, 176.1, 216, 413, 466

(56) References Cited

U.S. PATENT DOCUMENTS

| | | |
|---|---|---|
| 4,539,256 A | 9/1985 | Shipman |
| 4,726,989 A | 2/1988 | Mrozinski |
| 4,980,697 A | 12/1990 | Eklund |
| 5,581,905 A | 12/1996 | Huelsman et al. |
| 5,694,701 A | 12/1997 | Huelsman et al. |
| 5,813,133 A | 9/1998 | Munter et al. |
| 5,928,582 A | 7/1999 | Kenigsberg |
| 6,047,151 A | 4/2000 | Carvalho et al. |
| 6,134,808 A | 10/2000 | Yapel et al. |

FOREIGN PATENT DOCUMENTS

| | | |
|---|---|---|
| GB | 1409786 A | 10/1975 |

OTHER PUBLICATIONS

Adamson, A.W. "Physical Chemistry of Surfaces", 4th Edition, John Wiley & Sons Inc. (1982), Chapter 2, pp. 4–48.
Lopez de Ramos, A.L., "Capillary Enhanced Diffusion of CO2 in Porous Media," Ph.D. Thesis, University of Tulsa (1993).

*Primary Examiner*—Leo B. Tentoni
(74) *Attorney, Agent, or Firm*—Brian E. Szymanski

(57) ABSTRACT

A method and apparatus for producing microporous films. The method utilizes a casting surface and a condensing surface. The condensing surface is spaced from the casting surface to form a gap. The distance between the surfaces forming the gap is relatively small and is preferably less than 3 cm. A material, capable of forming microporous films through thermally induced phase separation processes, is cast onto the casting surface, preferably through conventional extrusion practices. The material contains at least one evaporative component that generally flashes off upon formation of the microporous material and condenses on the condensing surface.

17 Claims, 2 Drawing Sheets

PROCESS OF MAKING MICROPOROUS FILM

This application is claiming priority to U.S. Provisional Application Serial No. 60/235,222, filed Sep. 24, 2000, hereby incorporated by reference in its entirety. This invention relates generally to a method and apparatus for extrusion of materials, and more particularly to an extrusion method and apparatus for extruding a web (e.g., a film) into an environment that permits condensation and collection of evaporative components in the extruded material.

BACKGROUND OF THE INVENTION

Microporous films may be prepared by thermally induced phase separation (TIPS) processes. The noted processes typically involves extruding materials onto a casting surface. For example, the cast film may be a precursor to a microporous film where a molten solution of at least one crystallizable polymer (e.g., polyethylene) and a miscible diluent compound (such as mineral oil) is extruded from the die at a higher temperature (example: 400° F.) onto a lower temperature casting roll (example 150° F.). The resulting homogeneous solution phase separates when cooled after extrusion on the casting surface to form a two phase film of polymer and compound. The miscible compound (e.g., mineral oil) can be removed in subsequent processes such as solvent extraction etc. The resulting film can also be tentered and converted in subsequent processes to form a network of interconnected pores. The microporous materials of the present invention can be employed in a wide variety of situations where their microporous structures are useful. Microporous articles may be free-standing films or may comprise structures that have microporous, layers of the invention affixed to a substrate, such as structures made from materials that are polymeric, woven, nonwoven, foil or foam, or a combination thereof depending on the application. For example, they may be used in such diverse applications as the ultra filtration of colloidal matter, as diffusion barriers, as face oil removers, as diffuse light reflectors, or as separators in electrochemical cells. Further, they may be laminated to various substrates and the laminate may be utilized to form such articles as raincoats or other outerwear or camping equipment such as tents and sleeping bags. The microporous sheets of the present invention can be laminated to a woven cloth or a non-woven fabric such as a non-woven scrim. This scrim may be used to produce a disposable protective garment for use in a hospital or in an electronic clean room or in other areas such as where caustic chemical spills may be a problem.

The microporous sheet materials may be further utilized as filtering materials for cleaning antibiotics, beer, oils, bacteriological broths, for sample collection in air analysis, and for collecting microbiological specimens. They may also be utilized to make surgical dressings, bandages, and in other medical applications. Those of ordinary skill in the art will recognize that there are many other uses for microporous materials made in accordance with the present invention. See, for example, co-assigned U.S. Pat. Nos. 4,726,989 and 4,539,256 which are hereby incorporated herein by reference in their entirety.

In this process, it has been discovered that the quality of the resultant microporous film may be degraded by several mechanisms. First, the uniform quenching of the extruded film onto the casting roll is used to form a defect free film product. If the pinning wire is contaminated or damaged, uneven charging of the film will result, causing defects such as down web lines known as "worms".

It is conventionally recognized in the art of film casting to provide a pinning wire that is electrostatically charged to force the extruded material onto the casting surface. In one method, the pinning wire continuously traverses across the film width to present a fresh pinning wire which results in defect free surface on the extruded material. However, in the instance of microporous film manufacture, the diluent phase (ex. mineral oil), even though possessing a low volatility at room temperature, is volatile enough at the extruded high temperature to flash-off or evaporate a fractional amount. This flash-off of the low volatility solvent (typically mineral oil etc.) condenses on the pinning wire at a high enough rate and amount that the "worm" defects may be formed.

Second, the macroscopic appearance of the microporous film is adversely affected by the environment as found in conventional film extrusion heads. The airflow in these heads is either uncontrolled room type air or worse, even higher flows such as from exhaust ducts and plenums provided for ventilation or even partial capture of the flash-off low volatility diluent. This airflow and resultant uneven heat transfer can cause large scale visible patterns in the final film reminiscent of the "wood grain" or "mottle" patterns observed in dried coatings. This is the result of uneven conditions for the phase separation or quenching process that occurs in the extruded film. Additionally, the uneven conditions often lead to undesirable variations in the microscopic pore characteristics.

Finally, for continuous running of the microporous film casting process, it is an undesirable consequence that the fugitive low volatility solvent (e.g. mineral oil) that flashes off of the film recondenses on and contaminates the equipment and facility in the vicinity of the process. The condensate from a low volatility evaporative component can also contaminate the final microporous film product. Also, some of this oil/solvent is inevitably released into the air and the environment.

SUMMARY OF THE INVENTION

In this invention, deficiencies of microporous film casting in thermally induced phase separation processes are addressed by providing a controlled environment over a film cast onto a casting roll. A controlled environment enables the reduction of defects and the improved control over the process equipment and process conditions that lead to defects. The controlled environment is created through the use of capillary condensing surface technology. The combination of capillary condensing surface technology with thermally induced phase separation processes provides an improved method for forming microporous films.

The present invention is a method for producing microporous films. The method utilizes a casting surface and a condensing surface. The condensing surface is spaced from the casting surface to form a gap. The distance between the surfaces forming the gap is relatively small and is preferably less than 3 cm. A material is cast onto the casting surface, preferably through conventional extrusion practices. The material is capable of forming microporous films by thermally induced phase separation.

The casting surface in the present invention is in motion while the material is cast onto the casting surface. The casting surface is moved in a direction relative to the condensing surface in order to move the material through the gap. The material contains at least one evaporative component that generally flashes off upon formation of the microporous material and condenses on the condensing surface. The condensing surface temperature may be controlled to adjust the condensation rate of at least one evaporative component in the material.

The method is suitable for forming microporous films without defects associated with conventional processes related to the condensation of the evaporative component. In a preferred embodiment, the method is suitable for microporous free-standing films or structures that have microporous layers of the invention affixed to a substrate, such as structures made from materials that are polymeric, woven, nonwoven, foil or foam, or a combination thereof depending on the application. For example, they may be used in such diverse applications as the ultra filtration of colloidal matter, as diffusion barriers, as face oil removers, as diffuse light reflectors, or as separators in electrochemical cells. Further, they may be laminated to various substrates and the laminate may be utilized to form such articles as raincoats or other outerwear or camping equipment such as tents and sleeping bags. The microporous sheets of the present invention can be laminated to a woven cloth or a non-woven fabric such as a non-woven scrim. This scrim may be used to produce a disposable protective garment for use in a hospital or in an electronic clean room or in other areas such as where caustic chemical spills may be a problem.

The microporous sheet materials may be further utilized as filtering materials for cleaning antibiotics, beer, oils, bacteriological broths, for sample collection in air analysis, and for collecting microbiological specimens. They may also be utilized to make surgical dressings, bandages, and in other medical applications. Those of ordinary skill in the art will recognize that there are many other uses for microporous materials made in accordance with the present invention.

The present invention also includes an apparatus for making microporous films through thermally induced phase separation processes. The apparatus includes a casting surface that is suitable for receiving a cast material. The material capable of forming microporous films by thermally induced phase separation. In general the material includes at least one evaporative component upon formation of said microporous film. A condensing surface is spaced from the casting surface to form a gap between the casting surface and the condensing surface. The casting surface is capable of moving in a direction relative to said condensing surface in order to move the cast material through the gap. The condensing surface is maintained at a temperature to condense at least a portion of the at least one evaporative component on the condensing surface.

For purposes of the present invention, the following terms used in this application are defined as follows:

"microporous" means product or material characterized by a multiplicity of spaced, randomly disposed, non-uniform shaped, equiaxed particles of a crystallizable thermoplastic polymer; and "evaporative component" means a component or ingredient present as a major phase (diluent) in the film formation step or as an additional ingredient that is volatile at the casting temperatures.

Other features and advantages will be apparent from the following description of the embodiments thereof, and from the claims.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION

Figure 1:
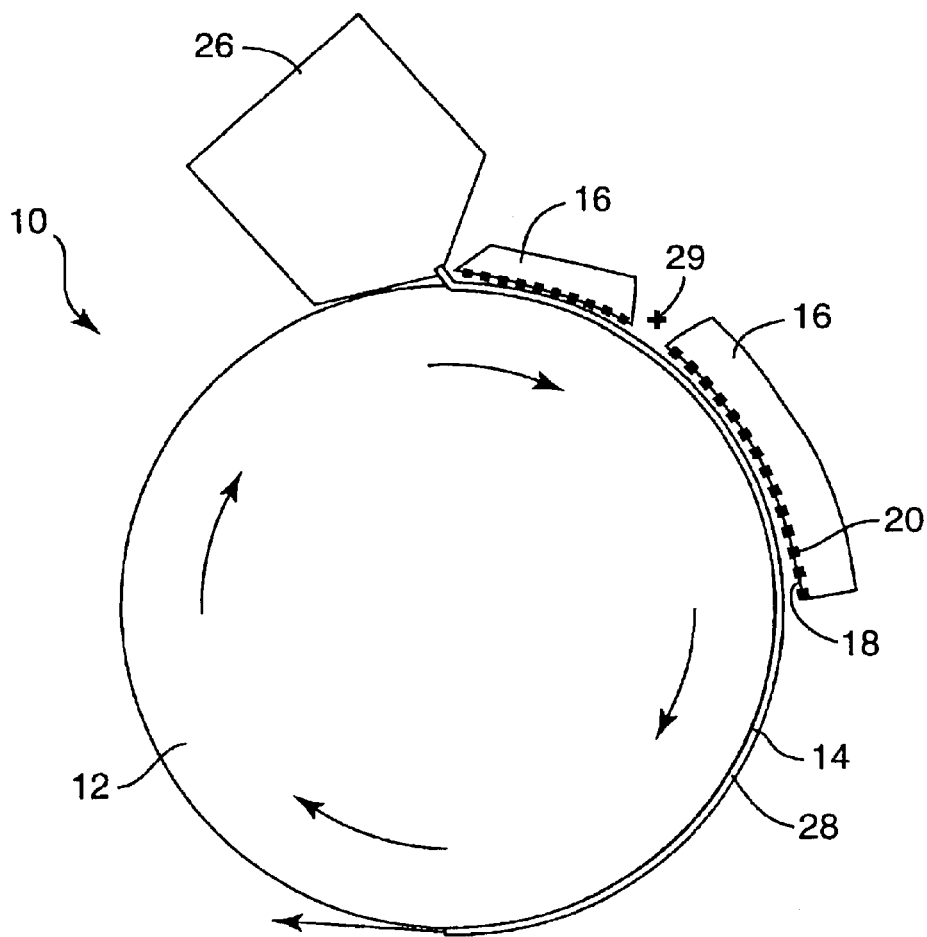
FIG. 1 is a schematic view of the present invention.
Figure 2:
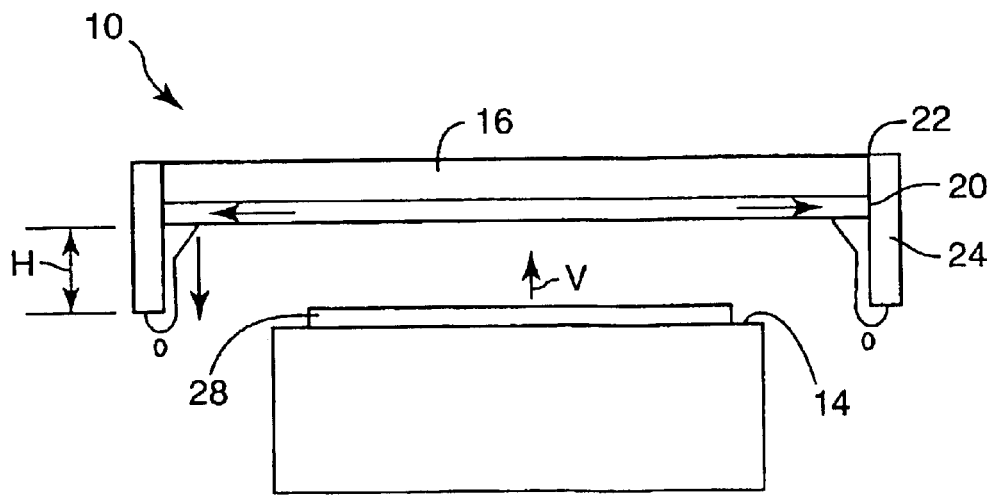
FIG. 2 is another schematic view of the present invention taken along datum 2–2 of FIG. 1.

The present invention, as depicted in FIGS. 1 and 2, is a thermally induced phase separation process 10 which includes a casting roll 12 having a casting surface 14. Condensing plates 16 are positioned in close proximity to the casting surface 14 to form a gap of distance H between the casting surface 14 and a condensing surface 18. An extruder die 26 is utilized to cast material 28 onto the casting surface 14. The material is a composition that is capable of forming microporous films through thermally induced phase separation processes. The material, upon being cast onto the casting surface 14, phase separates into a polymeric microporous film and a liquid that is immiscible with the polymer at the polymer's crystallization temperature. A portion of the liquid typically evaporates at the temperatures near the crystallization temperature of the polymer. The condensing surface may then condense at least a portion of the evaporative component V. The condensing surface may optionally include capillary grooves 20 to assist in conveying condensed liquid to an outer edge of 22 of the condensing surface. Edge plates 24 may be utilized to remove the condensed material away from the outer edges 22 of the condensing plate 16. The process 10 may optionally include a charged wire 29 to assist in pinning the cast material 28 to the casting surface 14.

The casting surface is generally any conventional substrate suitable for receiving a material capable of forming a microporous film by thermally induced phase separation. Conventional substrates include, for example, rolls, belts or wheels. It is preferred that the casting surface move in a direction relative to the condensing surface in order to convey the cast material through the gap. It is preferable that the casting surface is temperature controlled in order to assist in the formation of microporous material. Those skilled in the art recognize that surface characteristics are important for processing and end use applications of specific materials. Other examples of casting surfaces are polymeric films and non-woven substrates.

The present invention employs at least one condensing surface in close proximity to the casting surface. The condensing surface is located adjacent to an exposed surface of the material cast onto the casting surface. The condensing surface provides a driving force for condensation and solvent vapor transport across the gap. The condensation and simultaneous recovery of the evaporative components occur as the material is transported through the gap between the two surfaces. The present invention combines thermally induced phase separation practices with gap drying techniques. Gap drying systems are fully described in U.S. Pat. Nos. 6,047,151, 4,980,697, 5,813,133, 5,694,701, 5,581,905, and 6,134,808 all herein incorporated by reference in their entirety. The gap of the condensing surface to the cast film surface is preferably less than 3 cm. In a preferred embodiment, this gap is less than 0.3 cm to better control the airflows and collection of the evaporative components.

The condensing surface of the present invention may optionally include transverse open grooves or channels (hereinafter "capillary surfaces") that use capillary forces to prevent the condensed liquid from returning to the exposed surface of the cast material. The capillary forces also convey the condensed liquid laterally to the edges of the surface. Capillary force, or capillary pressure, can be described as the resultant of surface tension acting in curved menisci and is governed by the fundamental equation of capillarity known as the Young-Laplace equation. The Young-Laplace equation is $$\Delta p_c = \sigma\left(\frac{1}{R_1} + \frac{1}{R_2}\right),$$

where $\Delta p_c$ is the pressure drop across the interface, $\sigma$ is the surface tension, and $R_1$ and $R_2$ are the principal radii of curvature on the interface. Capillarity is discussed in detail in Adamson, A. W. "Physical Chemistry of Surfaces, $4^{th}$ Edition", John Wiley & Sons Inc. (1982).

A specific type of capillary surface is defined as a geometrically specific surface which satisfies the Concus-Finn Inequality which is: $\alpha+\theta_s<90°$, where $\alpha$ is half the included angle of any corner and $\theta_s$ is the gas/liquid/solid static contact angle. The static contact angle is governed by the surface tension of the liquid for a given surface material in gas. This type of capillary surface is helpful when the condensed liquid has a high surface tension. Capillary surfaces are discussed in great detail in Lopez de Ramos, A. L., "Capillary Enhanced Diffusion of $CO_2$ in Porous Media," Ph.D. Thesis, University of Tulsa (1993).

Figure 3:
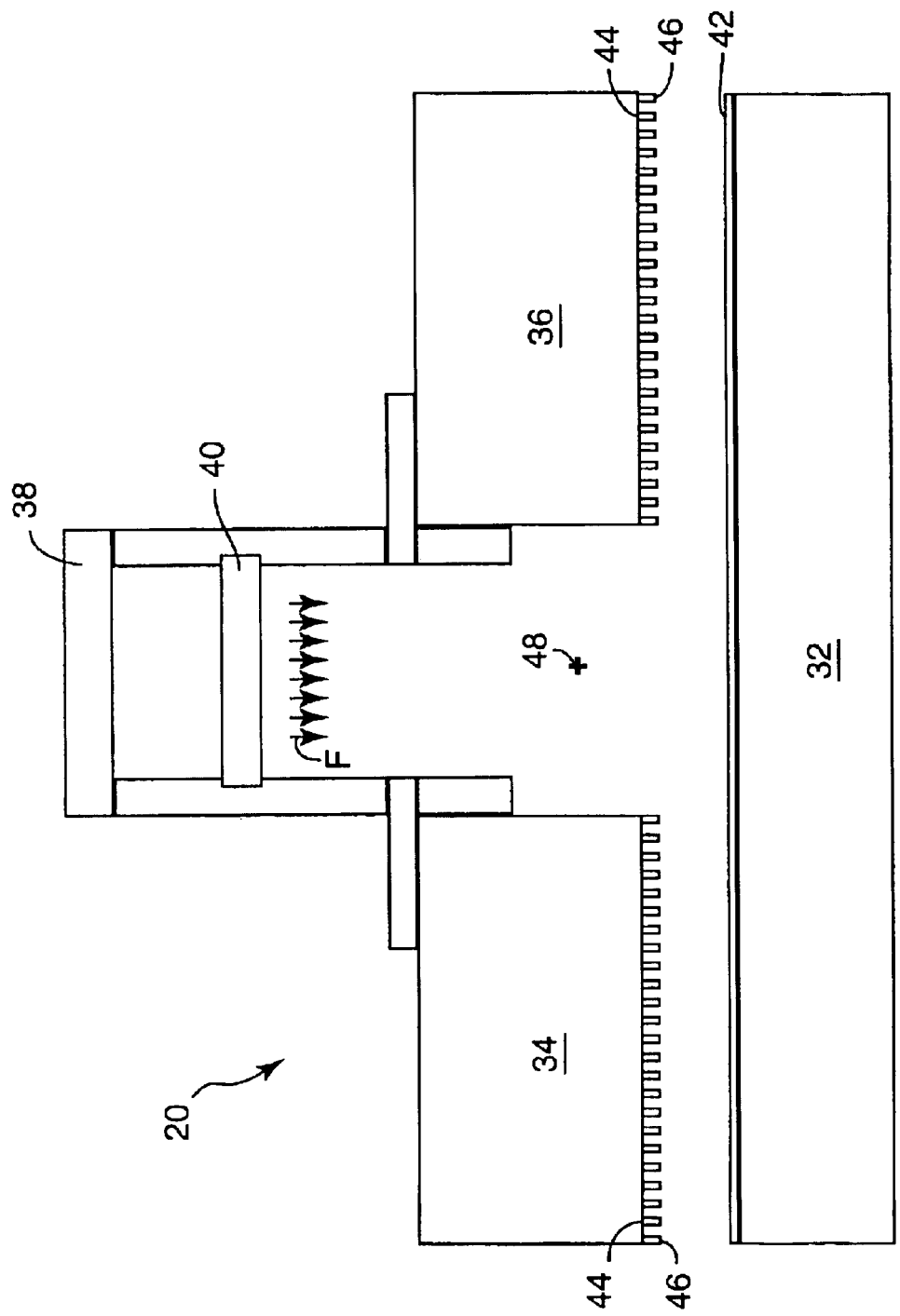
FIG. 3 is a segmented sectional view of an optional embodiment of the present invention.

Via capillary forces, liquid that has condensed on the surface 18 is drawn into the grooves and then caused to flow laterally to edge plates 66 (shown in FIGS. 1–3). When the liquid reaches the end of the grooves 20 it intersects with the angle between the edge plates 24 and the condensing surface 18. A liquid meniscus forms and creates a low pressure region which draws the liquid from the capillary surface to at least one edge plate 24. Gravity overcomes the capillary force in the meniscus and the liquid flows as films or droplets down the face of the edge plates. The condensed liquid can be collected from edge plates 66 for analysis, recycling, disposal or the like. This flow of condensed liquid off the plate allows vaporized material to continuously condense on the surface of the condensing plate without the condensed liquid dripping back onto the exposed surface of the material.

The grooves in the condensing surface can be triangular, rectangular, circular, or other more complex shapes. The groove material, geometry, and dimensions are designed to accommodate the required mass flow, which is dictated by the rate of separation and physical properties of the condensate, mainly, surface tension, viscosity, and density.

Although other types of materials can be used as capillary condensing surfaces, for example porous media, the lateral grooves provide high liquid transport rates and eliminate plate length requirements since downweb solvent removal is eliminated.

In a preferred embodiment, the condensing plate may be established in multiple zones. Multiple zones means having more than one condensing plate arranged to surround the casting surface. Each zone could have separate settings for any of the parameters for control of the process, such as, for example, gap distance, condensing plate temperature, and others. This may allow for more control of the process for greater productivity and product quality for varying process operating parameters.

Another optional embodiment of the present invention utilizes a vapor collection apparatus at a trailing end of a condensing plate. The apparatus is located in close proximity to the surface of the material in order to collect vapor that has not condensed on the condensing plate. Generally, the vapors are carried by the motion of the web in the adjacent gas phase portion of the surface of the material. A vapor collection system suitable for the noted purpose is fully described in U.S. patent application Ser. No. 60/274,050, filed concurrently with this application and herein incorporated by reference in its entirety.

Ingredients in the microporous film generally include crystallizable polymer, diluent, and nucleating agent. Examples of suitable crystallizable polymers, nucleating agents and diluents include those detailed in U.S. Pat. No. 4,726,989, previously incorporated by reference. Additional nucleating agents include: gamma quinacridone, aluminium salt of quinizarin sulphonic acid, dihydroquimiacridin-dione and quinaridin-tetrone, triphenenol ditriazine, two component initiators such as calcium carbonate and organic acids or calcium stearate and pimelic acid, calcium silicate, dicarboxylic salts of metals of the second main group of the periodic table, delta-quinacridone, diamides of adipic or suberic acids, calcium salts of suberic or pimelic acid, different types of indigosol and carbantine organic pigments, quiacridone quinone, N',N'-dicyclohexil-2,6-naphthalene dicarboxamind, and antraquinon red and bis-azo yellow pigments. Preferred agents include gamma-quinacridone, a calcium salt of suberic acid, a calcium salt of pimelic acid and calcium, zinc and barium salts of polycarboxilic acids.

Alternatively, additional ingredients may be utilized in the material. Non-limiting examples of additional ingredients include surfactants, surface active agents, antistatic agents, ultraviolet radiation absorbers, antioxidants, organic or inorganic colorants, stabilizers, flame retardants, fragrances, plasticizers, anti-microbial agents, repellents, and antifouling compounds.

In operation, the temperature of the capillary condensing surface should be set lower than the temperature of the extrusion die. The temperature of the capillary condensing surface should also be set lower than the boiling or smoke point temperatures of the solvent/oil in the microporous film. Preferably, the capillary condensing surface temperature will be set higher than the dewpoint of the water in the surrounding environment air to prevent undesired "sweating" of the water on the apparatus. Those skilled in the art are capable of sizing the system for specific conditions and materials.

The resulting microporous product will be characterized by a multiplicity of spaced, randomly disposed, non-uniform shaped, equiaxed particles of a crystallizable thermoplastic polymer. Such polymer particles will be surrounded by a diluent material and separated from one another to provide a network of micropores that are interconnected through fibrils. The size and shape of the micropores will be controlled by the casting method outlined above. The resulting film can be stretched uniaxially or biaxially to control the pore size. Additionally, the diluent can be removed to accomplish a similar control of the pore structure.

The condensing plates can be built to provide a gap or space for the pinning wire, as illustrated in FIGS. 1 and 3. The surfaces of the capillary condensing surface apparatus can optionally be constructed or covered with an electrically insulating material to prevent undesired arcing or interference with the electrostatic pinning process. Alternatively, a low volume air or gas purge can be supplied in the vicinity of the electrostatic pinning wire to maintain the environment there nearly unsaturated of the low volatility oil or solvent. The airflow must be uniform and controlled to minimize the development of unwanted patterns in the TIPS material due to non-uniform heat transfer to the cast film surface from the uneven air flows. Airflows less than 1 m/sec (200 fpm) are desired, with lower airflows of below 0.15 m/sec preferred. The airflow should be as uniform and laminar as possible.

Referring to FIG. 3, the apparatus 30 of the present invention generally includes a casting surface 32, condensing plates 34 and 36, and gas purging device 38. The material 42 passes underneath the condensing plates 34 and 36. Evaporative material condenses on the condensing surfaces 44 and is conveyed by capillary surfaces 46 as described above. A pinning wire 48 is employed to force the material onto the casting surface 32. The gas purging device 38 directs an airflow F past the pinning wire 48 in order to prevent condensation of the evaporative material on the pinning wire 48. Flow distribution media 40 is optionally included to provide uniform airflow.

One means of accomplishing this low airflow is through the use of a porous media. The porous plate may be constructed from a variety of materials, such as sintered metal, sintered plastic or ceramic, paper or synthetic filter media, screens, perforated plates or any combination thereof to produce generally uniform resistance to airflow necessary for laminar air flow. If the gas purge for the pinning wire is positioned between capillary condensing surfaces, it is contemplated that electrically insulating coatings could be used to shield the ends of the condensing plates as well as for coating or construction of the manifold assembly itself, because metallic electrically grounded surfaces could adversely consume the charged ions emitted from the pinning wire, thus reducing its effectiveness. This could be accomplished by coatings of polymer or ceramics, verneers of electrically insulators, or construction from electrical insulator materials. The gas could be any gas stream that does not undesirably react chemically with the cast material or the apparatus, and also does not contain undesired particulate or condensable contaminants. Such gases could include air, nitrogen, carbon dioxide, helium, or other inert gases.

The condensing surface adjacent to the die preferably includes an intimate seal to the die to prevent undesired escape of gas with the solvent/oil laden vapor. This escape is assisted by the chimney effect of natural convection driven by the hot die itself. This seal can be accomplished by providing a precision intimate gap alignment of the condensing surface to the die face or use of appropriate temperature and oil resistance seal materials such as metal foils, Teflon™, expanded Teflon™ gasket materials such as by W. L. Gore and Associates, ceramic and ceramic fiber sheeting or ropes, etc. It is undesirable to provide direct contact of the cool condensing capillary plate to the die because of undesirable cooling of the die and heating of the plate. Because of this, materials with a low thermal conductivity are desired for sealing. Alternatively, an additional vacuum collection slot could be provided at this location.

EXAMPLES

Example 1

This example illustrates the effect of the controlled casting method on the manufacture of TIPS microporous film.

For Sample 1A, a melt composition was formed by adding (1) 45 parts crystallizable polymer (polypropylene DS 5D45, 0.6–0.8 melt flow index, available from Union Carbide Corp., Danbury, Conn.), (2) 55 parts diluent (mineral oil available as White Mineral Oil #31, available from Chevron Products Company, San Francisco, Calif.) and (3) a melt-blended mixture containing 0.2 parts of a nucleating agent (dibenzylidine sorbitol available as Millad 3988 from Milliken Chemical) based on 100 parts of crystallizable polymer into a 25 mm co-rotating twin screw extruder (available as model ZE 25A from Berstorff, Charlotte, N.C.). The diluent was fed into the extruder through an injection port. The melt-blended mixture was a master batch that was formed by previously melt mixing 97.5 parts of a carrier polymer (polypropylene DS 5D45, 0.6–0.8 melt flow index, available from Union Carbide Corp., Danbury, Conn.) and 2.5 parts of the nucleating agent. The overall feed rate of all components was 6.8 kg/hr. The temperature in zones 1–3 of the extruder were maintained at about 204° C., 271° C., and 271° C., respectively. The temperature in zones 4–9 of the extruder was maintained at 227° C., respectively. The screw speed was 150 rpm.

The melt composition was then formed into a microporous film by passing the composition through a filter and pumping through a 381 mm film die maintained at 227° C. onto a 93° C. patterned casting wheel that was turning at approximately 4.3 mpm. This formed a film having a thickness of about 114 microns.

After exiting the film die, but prior to re-crystallization, the film passed underneath a capillary condensing surface structure that was positioned about 3 cm from the surface of the casting wheel. The capillary condensing surface structure was seated directly against the film die such that no mineral oil evaporate could escape from that position. The capillary condensing surface structure consisted of two plates with an 8 cm space between the plates to allow for an electrostatic pinning assembly. An electrostatic pinning wire was not used in this example, therefore a 50 micron sheet of clear polyester film was used to cover the space between the capillary condensing surface plates such that no mineral oil evaporate could escape from that position.

The capillary condensing surface structure was cooled using circulating plant water. The temperature of the capillary condensing surface plates was 10° C.

Sample 1B was made as Sample 1A except that the temperature of the capillary condensing surface plates was increased to 34° C.

Sample 1C was made as Sample 1A except that the temperature of the capillary condensing surface plates was increased to 57° C.

Comparative Example 1 (C1) was made as Sample 1A except that no capillary condensing surface plates were used during the casting of the microporous film. That is, the space above the casting wheel was clear of any equipment.

Samples 1A–1C exhibited less fugitive mineral oil evaporate when compared to sample C1. The amount of air flow around the casting wheel area was decreased with the capillary condensing surface plates present. This allowed the evaporating mineral oil to follow the direction of the casting wheel and collect on the capillary condensing surface plates. Due to the low total throughput rate, and correspondingly a low amount of mineral oil evaporate, the first two grooves in the capillary condensing surface structure closest to the film die where filled with mineral oil whereas the other grooves were mostly clear of mineral oil condensate.

A decrease in mineral oil evaporate was seen after the capillary condensing surface plate temperature was increased. This corresponds to more mineral oil being condensed on the plates as the temperature was increased.

The "frost line" that indicates film quenching moved further down web on the casting wheel (to the five o'clock position) when the capillary condensing surface plates were present versus Comparative Example 1 where the "frost line" is close to the die (one o'clock position). The microporous film formed in samples 1A–1C is acceptable under current standards.

Example 2

This example illustrates the ability of the capillary condensing surface structure to condense additional microporous film additives.

Sample 2A was made in the same manner as Example 1A except a different melt composition and feed rate was used. The casting wheel speed and resulting film caliper was also different from Example 1A. For Sample 2A, a melt composition was formed by adding (1) 63 parts crystallizable polymer (polypropylene DS 5D45, 0.6–0.8 melt flow index, available from Union Carbide Corp., Danbury, Conn.), (2) 35 parts diluent (mineral oil available as White Mineral Oil #31, available from Chevron Products Company, San Francisco, Calif.), (3) a melt-blended mixture containing 0.02 parts of a nucleating agent (a Gamma-Quinacridone available as Hostaperm E3B Red permanent pigment from Clariant, Minneapolis, Minn.), and (4) 2.0 parts of a melt additive (available as Span-20 from Ruger Chemical Company, Irvington, N.J.) based on 100 parts of crystallizable polymer into a 25 mm co-rotating twin screw extruder (available as model ZE 25A from Berstorff, Charlotte, N.C.). The diluent was fed into the extruder through an injection port. The melt-blended mixture was a master batch that was formed by previously melt mixing 96 parts of a carrier polymer (polypropylene, 2.5 melt flow index, available as Fina 3374 from Fina Oil & Chemical, Dallas, Tex.) and 4.0 parts of the nucleating agent. The overall feed rate of all components was 4.5 kg/hr. The casting wheel speed in Sample 2A was 2.3 mpm which resulted in a microporous film thickness of 178 microns. The capillary condensing surface structure was maintained at a temperature of 10° C.

Sample 2B was made as Sample 1A except that the temperature of the capillary condensing surface plates was increased to 36° C.

Sample 2C was made as Sample 1A except that the temperature of the capillary condensing surface plates was increased to 56° C.

Comparative Example 2 was made as Sample 2A except that no capillary condensing surface plates were used during the casting of the microporous film. That is, the space above the casting wheel was clear of any equipment.

The addition of Span-20 traditionally increases the amount of volatile components around the casting area by approximately 75–100%. The trends seen in Example 1, such as increasing the capillary condensing surface structure temperature resulted in more condensation of the volatile components, holds true for Example 2. As in Example 1, the total throughput of the extruder limited the amount of volatile component recovery. It was therefore difficult to quantitatively measure the amount of Span-20 that was recovered versus the amount of fugitive mineral oil. However, there did not seem to be an increase in smoke present at the exit of the capillary condensing surface plates. This leads one to believe that the plates were effectively condensing the extra volatile substance.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. An extruding method comprising:
   (a) providing a casting surface and a condensing surface spaced from said casting surface to form a gap between said casting surface and said condensing surface;
   (b) extruding a material onto said casting surface, said material capable of forming microporous films by thermally induced phase separation, said material having at least one evaporative component upon formation of said microporous film;
   (c) moving said casting surface in a direction relative to said condensing surface in order to move the material through said gap; and
   (d) maintaining a condensing surface temperature to condense at least a portion of said at least one evaporative component on said condensing surface.

2. The method of claim 1, further comprising adjusting said gap to control the rate of condensation of said at least one evaporative component.

3. The method of claim 1, wherein said material is extruded onto said casting surface at temperature higher than a temperature of said casting surface.

4. The method according to claim 1, wherein the casting surface is provided on a roll, belt or wheel, and moving said casting surface includes rotating said roll, belt or wheel.

5. The method according to claim 1, wherein either said gap or said condensing surface temperature are adjusted to vary condensation rate of said at least one evaporative component.

6. The method according to claim 1, wherein the material includes a thermoplastic polymer, a diluent, and a nucleating agent.

7. The method according to claim 1, further comprising removing the condensate from said condensing surface while said condensate remains in a liquid state.

8. The method according to claim 1, wherein said condensing surface comprises a capillary surface.

9. The method according to claim 1, wherein said condensing surface has a trailing end relative to the motion of the casting surface, and an exhaust passageway is provided adjacent the trailing end, the method further comprising capturing exhaust exiting the gap through the exhaust passageway.

10. The method according to claim 1, further comprising pinning said material to said casting surface after extruding said material.

11. The method according to claim 10, wherein said pinning is accomplished with an electrically charged wire.

12. The method according to claim 11, wherein the condensing surface comprises two condensing surface portions separated by a slot exposing said material to an electrical field from the electrically charged wire.

13. The method according to claim 12, further comprising flowing gas past the electrically charged wire to reduce concentration of evaporative components in the vicinity of the electrically charged wire.

14. The method according to claim 1, wherein the step of extruding material onto a casting surface further comprises forming a web on the casting surface.

15. The method of claim 1, further comprising controlling casting surface temperature, material temperature, or combinations thereof to adjust an evaporation rate of said evaporative component.

16. A casting method comprising:
   (a) providing a casting surface and a condensing surface spaced from said casting surface to form a gap between said casting surface and said condensing surface;
   (b) casting a material onto said casting surface, said material capable of forming microporous films by thermally induced phase separation, said material having at least one evaporative component upon formation of said microporous film;

(c) moving said casting surface in a direction relative to said condensing surface in order to move the material through said gap; and (d) maintaining a condensing surface temperature to condense at least a portion of said at least one evaporative component on said condensing surface.

17. A method according to claim 16, wherein casting is accomplished through extrusion.

* * * * *

UNITED STATES PATENT AND TRADEMARK OFFICE
CERTIFICATE OF CORRECTION

PATENT NO. : 6,790,404 B2
DATED : September 14, 2004
INVENTOR(S) : Yapel, Robert A.

It is certified that error appears in the above-identified patent and that said Letters Patent is hereby corrected as shown below:

Column 10,
Line 23, "vary condensation" should be shown as -- vary a condensation --

Signed and Sealed this

Fifteenth Day of February, 2005

JON W. DUDAS
*Director of the United States Patent and Trademark Office*